US008919821B2

(12) United States Patent
Reid et al.

(10) Patent No.: US 8,919,821 B2
(45) Date of Patent: Dec. 30, 2014

(54) SECURITY SUBSTRATE INCORPORATING ELONGATE SECURITY ELEMENTS

(75) Inventors: Duncan Hamilton Reid, Basingstoke (GB); Gerald Sidney Payne, Bath (GB); Paul Howland, Andover (GB); Peter McLean Henderson, Frome (GB)

(73) Assignee: De La Rue International Limited, Hampshire (GB)

( * ) Notice: Subject to any disclaimer, the term of this patent is extended or adjusted under 35 U.S.C. 154(b) by 1873 days.

(21) Appl. No.: 10/586,291

(22) PCT Filed: Jan. 17, 2005

(86) PCT No.: PCT/GB2005/000173

§ 371 (c)(1), (2), (4) Date: Mar. 14, 2007

(87) PCT Pub. No.: WO2005/069231

PCT Pub. Date: Jul. 28, 2005

(65) Prior Publication Data

US 2008/0122218 A1 May 29, 2008

(30) Foreign Application Priority Data

Jan. 16, 2004 (GB) .................................. 0400984.1

(51) Int. Cl.
*B42D 15/00* (2006.01)
*G09C 3/00* (2006.01)
*G07D 7/12* (2006.01)

(52) U.S. Cl.
CPC ........................................ *G07D 7/12* (2013.01)
USPC ............... 283/108; 283/74; 283/75; 283/107; 283/109; 283/110

(58) Field of Classification Search
USPC ............... 283/74, 75, 81, 107, 108, 109, 110; 428/40.1, 42.2, 42.3, 195.1, 43, 916
See application file for complete search history.

(56) References Cited

U.S. PATENT DOCUMENTS 225,279 A 3/1880 Haymond ........................ 283/70
4,290,630 A * 9/1981 Lee ................................ 283/82

(Continued)

FOREIGN PATENT DOCUMENTS

EP 0005905 4/1979
EP 0319157 11/1988

(Continued)

OTHER PUBLICATIONS

PCT International Search Report dated May 13, 2005 in regards to PCT Application No. PCT/GB2005/000173.

(Continued)

*Primary Examiner* — Shelley Self
*Assistant Examiner* — Justin V Lewis
(74) *Attorney, Agent, or Firm* — Ohlandt, Greeley, Ruggiero & Perle, LLP

(57) ABSTRACT

The present invention is concerned with providing security substrates, and documents made therefrom, such as banknotes, with features for visual inspection by members of the public. More specifically the invention relates to a novel security substrate containing at least two elongate security elements for the purposes of public and non-public verification. The security substrate comprises a substrate and at least two elongate security elements each having a width of less than or equal to 6 mm. The security elements are at least partially embedded within the substrate and running substantially parallel to each other with a gap therebetween of no greater than 10 mm. The total cross-directional width of a zone occupied by the two security elements and the gap is less than or equal to 18 mm.

31 Claims, 3 Drawing Sheets

(56) References Cited

U.S. PATENT DOCUMENTS

| | | | | | |
|---|---|---|---|---|---|
| 4,591,707 | A | * | 5/1986 | Stenzel et al. | 283/83 |
| 4,943,093 | A | * | 7/1990 | Melling et al. | 283/83 |
| 5,338,862 | A | * | 8/1994 | Aiman et al. | 548/316.4 |
| 5,447,335 | A | * | 9/1995 | Haslop | 283/91 |
| 6,471,247 | B1 | * | 10/2002 | Hardwick et al. | 283/72 |
| 6,607,813 | B2 | * | 8/2003 | Washburn et al. | 428/211.1 |
| 2001/0028169 | A1 | * | 10/2001 | Lazzerini | 283/84 |
| 2003/0104176 | A1 | * | 6/2003 | Schwenk | 428/195 |

FOREIGN PATENT DOCUMENTS

| | | |
|---|---|---|
| EP | 0860298 | 8/1998 |
| JP | 2000290896 | 10/2000 |
| NL | 9300515 | 10/1994 |
| WO | WO87/06041 | 10/1987 |
| WO | WO98/00815 | 1/1998 |
| WO | WO03/095188 | 11/2003 |

OTHER PUBLICATIONS

British Search Report dated Apr. 22, 2005 in regards to British Patent Application No. GB0500929.5.

"*Money Facts*,"The United States Treasury Bureau of Engraving and Printing, Aug. 24, 2006, pp. 1.

PCT Written Opinon dated May 13, 2005 in regards to PCT Application No. PCT/GB2005/000173.

Chinese Office Action dated Sep. 25, 2009 for Chinese Application No. 2005-80002426.X.

* cited by examiner

SECURITY SUBSTRATE INCORPORATING ELONGATE SECURITY ELEMENTS

CROSS-REFERENCE TO RELATED APPLICATIONS

The present application is a U.S. national stage entry under 35 U.S.C. 371, of International Application No. PCT/GB2005/000173, filed Jan. 17, 2005. Priority in the International Application is claimed from UK Patent Application No. 0400984.1, filed Jan. 16, 2004. The content of both references is herein incorporated by reference.

BACKGROUND OF THE INVENTION

1. Field of the Invention

The present invention is concerned with providing security substrates, and documents made therefrom, such as banknotes, with features for visual inspection by members of the public. More specifically the invention relates to a novel security substrate containing at least two elongate security elements for the purposes of public and non-public verification.

2. Description of the Related Art

The inclusion of elongate elements, or security threads, into security paper is well known and has been widely described in the prior art. Such threads may be wholly or partially embedded into the paper. Partially embedded threads are commonly referred to as being windowed, as the thread surfaces at regular intervals on the paper surface like a series of windows. A number of methods for producing security papers with such windowed threads are known, one of which is described in EP-A-059056. Paper is still regularly produced by this method and sold commercially under the trade name Stardust®.

EP-A-059056 describes a method of manufacture of windowed thread paper on a cylinder mould papermaking machine. The technique involves embossing the cylinder mould cover and bringing an impermeable elongate security element into contact with the raised regions of an embossed mould cover, prior to the contact entry point into a vat of aqueous stock, referred to as a “Stardust track”. Where the impermeable security element makes intimate contact with the raised regions of the embossing, little or no fibre deposition can occur. After the paper is fully formed and couched from the cylinder mould cover, the water is extracted from the wet fibre mat and the paper is passed through a drying process. In the finished paper the contact points leave exposed regions of the security element which ultimately form the windows, which are visible in reflected light, on one side of the paper.

One problem which can arise in the production of windowed paper is where the threads are embedded in exactly the same position in every sheet. This means that the paper is extra thick in the region of the thread and problems arise in the paper finishing processes, especially during guillotining, as the stack of paper is markedly higher where the threads overlie each other. The problem is commonly solved by deliberately wandering the cross directional position of the thread, within a region typically 12 to 18 mm wide.

The use of windowed security threads has proved to be a highly effective security feature. However, as threads have developed and become more complex with the introduction of text, colour shifting features and holographic designs, there has been an increasing need to increase the width of the threads and thus the visual impact associated with the thread. This is particularly the case for holographic threads where the visual impact of the thread is very much dependent upon the area that is exposed and thus viewable. For threads bearing text, the wider the thread the bigger and, therefore more readable the text is. To this end, there has been a constant drive amongst security paper makers to produce security paper with wider threads.

The method described in EP-A-059056 has therefore been developed and enhanced to enable the embedding of wider threads into the paper substrate. EP-A-860298 describes one approach for embedding wide threads, that is threads having a width 2 mm or greater, into paper. A first paper web is manufactured according to the method described in EP-A-059056 and to this a second thinner paper web is applied, thus masking any fortuitous flaws on the reverse of the first paper web. Though effective, the method described in EP-A-860298 is not suitable for all types of paper machine.

Another alternative approach to the embedding of wider threads is described in patent specification WO-A-03095188. Here the shape of the bridges, which are formed between the windows, is modified to allow for improved water dispersion and to prevent the bridges splitting as the paper passes through the press section of the paper machine. This method is suitable for threads up to 6 mm wide, although the stated preferred width is 4 mm.

The thread width at which defects, such as poor window definition, bridge splitting and thread show through on the back side of the paper, become unacceptable is not only a function of the production method, but is also a function of the end use application. For example some users will require a higher quality paper than others, resulting in a narrower limitation to the thread width. Applications in which the finished document is only viewed from the front side are not limited by defects on the backside of the document, which is the side opposite to the windows in the case of windowed threads.

Furthermore it has been found that the production of paper with wide threads up to 6 mm wide, but more commonly between 2 and 4 mm wide, can limit the paper machine speed.

SUMMARY OF THE INVENTION

The present invention provides an alternative solution to the need for providing increased public security. Rather than introduce a single wide thread, the width limitation has been accepted as it has been recognised that a similar, and in some cases greater, visual impact can be achieved by embedding two threads into the substrate simultaneously and in close proximity to one another, preferably in a windowed format.

To this end the invention provides a security substrate comprising at least two elongate security elements each having a width of less than or equal to 6 mm, said security elements being at least partially embedded within the substrate and running substantially parallel to each other with a gap therebetween of no greater than 10 mm, wherein the total cross directional width of a zone occupied by two security elements and the gap is less than or equal to 18 m The width of the security element is preferably less than 4 mm and more preferably less than 2 mm.

It has been found that, by placing two discrete security elements in close proximity within a document provides significant public security benefits over wide, twisted, braided or woven security element constructions. Surprisingly when two or more security elements are placed side by side they dramatically increase the overall visual impact of the security elements compared to having a single security element, even if that single security element is as wide as the combined width of the security elements in close proximity to one another.

There are several reasons for this which will now be explained as follows:—

Area Effect

The ability to see a security feature is in part dependant on the area it covers. When two or more security elements are situated in close proximity such that they both appear near the centre of the field of vision, the viewer perceives the feature as covering an area bounded by the two outermost security elements. This area is greater than the area of the individual security element and is thus more likely to be noticed.

Complexity Effect

Where two or more security elements in close proximity lead to a more complex visual effect than the separate viewing of the individual security elements, the viewer is drawn to "investigate" the feature. This is because it represents an unexpected visual experience. The "chequer board"example demonstrates this effect (see FIG. 6 and the corresponding description below).

One Feature Leading to Another Effect

When the security feature comprises two or more security elements in close proximity at least one of which is more visible that the other(s), the viewer is first drawn to the more visible feature and, as a consequence, then sees the less visible security element(s). An example of this is two security elements running in close proximity one of which is embedded (less visible) and the other is windowed (more visible).

Unexpectedness Effect

This effect is based on the observation that when two security elements in close proximity comprise a windowed security element and an embedded security element, the viewer is surprised when the embedded security element appears as a consequence either of the embedded security element being visualised, by viewing in transmission or, if it is fluorescent, by viewing under UV light. The surprising nature of this experience leads to it being remembered and thus more useful as a security feature.

Cross Referencing Effect

This is a benefit obtained from having one security element that references directly and usefully to the other security element(s). An example is a security element with micro-text that is hard to read but difficult to counterfeit and a second security element that has the same text, but in a form that is easier to read, but necessarily easier to counterfeit. The user is then prompted to check that the less visible text is correct and the security of the combined threads is thus enhanced.

It is recognised that security documents containing more than one thread have hitherto been produced. However, in such examples the two threads have been introduced to provide different types of protection. For example one thread may be present as a visual public security device and the second present for machine reading, but providing no visual security. Indeed the machine-readable threads are often designed to minimise their visual impact. Furthermore thethreads are placed such that they are not in close proximity to each other; indeed they are usually placed a sufficient distance apart to prevent a user being confused.

Dutch patent specification NL-A-9300515 describes the embedding of two threads in a security document. In this document, however, it is suggested that the two threads should be embedded one directly on top of the other. This does little to improve the public security of the document as one of the threads will be completely obscured by the other.

Patent specification WO-A-03029003 also describes the inclusion of two threads within a security document for the purposes of improving the durability of the document. The threads are inserted such that they sit close to the edges of the finished document to prevent edge tear propagation. Their main purpose is not to provide public security, and even if it were the two threads are placed at so great a distance apart they act as two discrete security elements rather than functioning essentially as a single device as in the present invention.

An alternative approach to providing different types of protection has been to take multiple thread constructions and combine them into a single thread during or post production of the threads. One example of this is described in Patent Specification EP-A-520060. Here a thread is manufactured by twisting or braiding multiple filaments together. Each of the filaments is preferably a different colour or has different functional properties. However it should be noted that, even though the thread is made up of several filaments, it is still embedded as a single device. Indeed the filaments described are thin and, when combined together, do not produce a strong visual impression and require close inspection to validate the document, thus limiting the device's appeal as a public security element.

It is recognised that the principle of the invention described in EP-A-520060 could be developed and, rather than thin filaments wider thread elements could be twisted, braided, or more likely woven together, to form a single device that could also be embedded. Each of the thread elements would have to be of a width of at least 0.5 mm in order for them to provide reasonable public security benefit. Indeed if the thread element is intended to carry text for public inspection such as described in Patent Specification EP-A-319157 then it should be of a width of at least 1 mm to allow easy public inspection. An approach similar to this is described in Patent Specification DE-A-19809085. In this document different threads are woven or spun together to form a security element that can then be embedded into paper.

However, such approaches are costly and create difficulties during the paper making approach and are therefore not preferred. Combining multiple different types in a braided, twisted or woven manner could be confusing to the public and actually detract from the public security of the individual elements.

It may be expected that, from a manufacturing point of view, the use of multiple security elements in close proximity in accordance with the present invention would be disadvantageous compared to security elements separated by a greater gap. The reason being that the equipment used to guide the security elements to the correct position in the forming process will be more cluttered. It is therefore surprising that the opposite is in fact the case, and indeed positive advantages have been identified with respect to the present invention. These are described below.

Guiding Pulleys

It has been found that, when multiple security elements are located sufficiently close to each other, it becomes practical to run them over a single guide pulley with adjacent grooves to separate the security elements rather than using multiple pulleys, which are required when the security elements are separated by a greater distance. Thus the number of pulleys requiring adjustment and maintenance are at least halved.

Window Embossing

When two or more widely separated windowed security elements are incorporated in a document, separate raised portions of the embossed mould cover have to be produced for each security elements. When the security elements are in close proximity, according to the present invention, a single raised portion of the embossed mould cover can be used for all security elements. This is a significant benefit because it reduces the cost and time required to make the mould cover.

Paper Inspection

Paper is automatically inspected at various stages of the production process in order to check for dirt, holes, print defects etc. For many inspection devices, the area occupied by the security element has to be electronically masked in order to prevent the security element from being inadvertently identified as a defect. This includes the area traversed by the security element which is wandered deliberately for reasons explained above. This results in this masked area not being inspected. For two widely separated security elements this non-inspected area would typically exceed a 24 mm band in the machine direction of the document. When the security elements are brought within close proximity of one another, according to the present invention, this area can be greatly reduced to as little as 12 mm in the case of two 2 mm wide threads separated by 1 mm and wandering within a 12 mm wide area down the length of a document. This results in a discernable improvement in quality control.

Graphic Area

The presence of windowed security elements in a document can reduce the area available for printed or other security features. This is especially true if the security element detracts from the security or aesthetic performance of the print or other security feature. When two or more "wandered" windowed security elements are present in a sheet, the area affected is an additional band 12 mm wide for each security element. However, when the security elements are utilised in the manner according to the present invention, the area affected by the presence of the security elements is limited to typically as little as 12 mm for all the security elements.

It is to be understood that the terms 'security paper', 'security document' and 'banknote' in this specification include such items that are manufactured wholly from natural fibres (e.g. cotton or wood), partially from natural and partially from synthetic fibres (e.g. nylon, polyvinyl alcohol, viscose), and wholly from synthetic materials (e.g. spun-bonded polyolefin, polypropylene, or other filmic plastics).

DESCRIPTION OF THE DRAWINGS

Preferred embodiments of the present invention will now be described by way of example only, with reference to the accompanying drawings, in which:—

DESCRIPTION OF THE INVENTION

Figure 1:
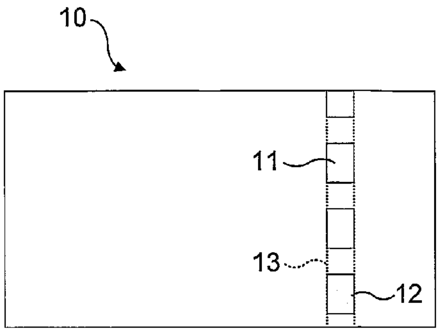
FIG. 1 is a plan view of an example of a prior art document containing a single wide thread.

Referring first to FIG. 1, this illustrates an example of a prior art substrate 10 manufactured according to EP-A-860298 whereby a security element, in the form of single wide thread 11, is embedded into a paper substrate 10. In this context a wide thread is considered to be any thread having a width greater than 2 mm. Such wide threads have proved to be commercially successful and the additional exposed area allows for better use of optically variable devices and features such as diffractive elements, thin film interference devices, liquid crystal layers, OVI® layers and the like. This is particularly the case if such devices are to be utilised in combination with other features, such as those described in EP-A-319157.

However paper incorporating wide threads requires sophisticated paper making equipment and can be costly to produce. The increased complexity of production, though acceptable and indeed beneficial for some applications, is not always appropriate for all types of security documents. To this end the present invention enables the use of less complex paper making technologies, but improves the amount of exposed area of thread and thus the visual impression and public security of the finished document.

In FIG. 1 the thread 11 is exposed at windows 12 formed in the surface of the substrate 10 and covered by bridges 13 of paper fibre formed between the windows 12

Figure 2:
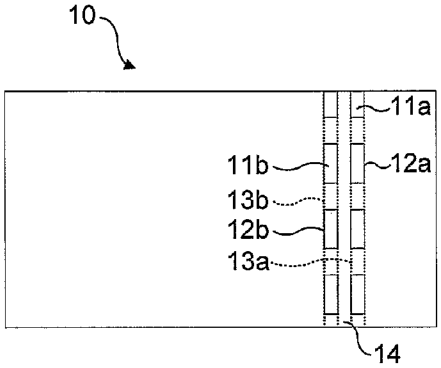
FIG. 2 is a plan view of a first example of a security document according to the present invention.

FIG. 2 illustrates a first example of a document according to the present invention. Here two security elements 11*a*, 11*b*, in the form of threads, are inserted side by side in close proximity, substantially parallel to each other, with a gap 14 there between. In this example the two threads have been inserted according to the methods described in EP-A-059056. A single window track has been embossed into the cylinder mould cover and both threads are inserted using this one window track.

In order that the aforementioned advantages are realised, the two security elements 11*a*, 11*b* need to be close enough to enable a single inspection field, i.e. so that they both appear near to the centre of the field of vision. However, they need to be separated by a gap sufficiently wide to prevent window and bridge defects, including back side sparkle, which are common disadvantages with single wide threads. With the two elements 11*a*, 11*b* running substantially parallel to each other, and accepting a degree of wander of the elements 11*a*, 11*b* from a linear track into the machine direction, the overall width of the cross directional zone occupied by the width of the two elements 11*a*, 11*b* and the gap 14 between the elements 11*a*, 11*b* must be less than or equal to 18 mm. The width of the aforementioned zone is preferably less than or equal to 14 mm, with the gap 14 being no greater than 10 mm. The gap 14 should be at least greater than or equal to 1 mm to prevent the aforementioned defects, and more preferably greater than or equal to 2 mm. The elements 11*a*, 11*b* should also be sufficiently narrow to prevent these same defects, preferably have a width of less than or equal to 6 mm, but more preferably less than or equal to 4 mm, and even more preferably less than or equal to 2 mm.

One preferred embodiment would comprise two elements 11*a*, 11*b* each having a width of 2 mm each and a gap of 10 mm therebetween, giving the width of the cross directional zone as 14 mm. In another preferred embodiment the elements 11*a*, 11*b* have different widths, of 1.6 mm and 2.4 mm respectively with a gap of 8 mm, giving the cross-directional zone width as 12 mm. In a third embodiment the elements 11*a*, 11*b* have widths of 4 mm each and the gap-is 10 mm, giving the cross-directional zone width as 18 mm.

The two threads 11*a*, 11*b* may be the identical, but are more preferably different. The ability to introduce two different types of security thread into a single document in close proximity allows for a range of novel effects that would not be possible or would be considerably harder to achieve on a single thread. Examples of such effects are described below.

It is possible to create opposing kinetic and colour movement effects when using diffractive or holographic threads. The first thread is introduced in such a way that the movement effects move from top to bottom along the thread and the second thread introduced so the movement effects run bottom to top. This provides a striking visual feature that can be easily verified by the public. Further to this, both threads may show the same type of movement effect or they may show different types of movement effects.

In an alternative application two holographic threads may be used with mutually opposed image replay, i.e. at a first viewing angle the images on the first thread will replay strongly but the images on the second thread do not replay. At a second viewing angle the images on the first thread do not replay, but the images on the second thread replay strongly. This mutually opposed variation is very hard to mimic and provides a strong security feature. In addition to the mutually opposed images both threads may have additional images that replay at substantially all viewing angles.

The two threads may be provided with different, but related, information to assist in verification. For example the first thread may have negative demetallised indicia detailing pertinent information whereas the second thread may have positive demetallised indicia detailing the same or different information. Methods for the provision of positive and negative indicia by demetallisation are very well known in the security field, for example as described in EP-A-536855, EP-A-330733 or EP-A-1023499. The threads will contrast in their visible appearance under both reflected and transmitted light. Such a contrast is visually very striking and again aids the process of authentication.

The two threads may deliberately be designed for viewing in two different ways. For example the first thread may have demetallised indicia (positive or negative) produced in a size that is easily viewable by the human eye. The second thread, on the other hand, may contain smaller text that may require a small magnifying glass or other such device to view. By placing the two threads in such close proximity it is far easier for the viewer to cross reference the microtext on the second thread to the main text on the first thread thus aiding authentication. A similar approach can be used with a first thread being printed with information visible in white light and the second thread being printed with information only viewable under non-visible illumination such as UV light. Obviously non-visible features can be combined with other visible features such as printed, demetallisation and holographic as is well known to those skilled in the art.

The two threads may be provided with demetallised information having a different visual impression. For example a first thread may have demetallised negative indicia (i.e. text or information defined by non-metal areas) of a size that is easily viewable. The second thread may be provided with demetallised indicia which are smaller in size than those on the first thread and as such not as easily recognisable. As an alternative, the first thread may have demetallised negative indicia and the second thread have demetallised positive indicia (i.e. text or information defined by metal areas). In both of the examples, the information on the two threads is complementary, but presented such as to give a different visual impression.

A further example of where two threads can interact to aid in the authentication process is where a thermochromic thread is used. One such thermochromic thread is Thermotext® sold by De La Rue International Limited and described in EP-A-608078. The Thermotext thread has a first and second viewing condition. The thread can be viewed in an unactivated state where the thermochromic ink is opaque and masks information printed underneath. In an activated state the thermochromic ink is warm and goes transparent to reveal the information underneath. Typically the information revealed will be pertinent to the product or item being protected. If a second thread is provided also displaying the information to be revealed the user will have a reference. Further to this the information of the second thread may be provided as a holographic image or other such high security feature thus significantly increasing the protection against counterfeiting. Furthermore the transition temperature for two or more thermochromic threads can be different so that at least one of the threads exhibits a transition in the ambient temperature regardless of whether the ambient conditions are cold or hot.

The two threads may each be provided with a different colourshift feature. For example one may be provided by a multilayer thin film, dichroic or holographic feature and the second a liquid crystal, iridescent or pearlescent feature. A further example would be to provide the two threads with the same type of feature, but having a different colourshift, e.g. one could be a green-gold and the other a magenta-blue. In yet a further example, the two threads are colour matched at one angle, but not at all other angles. In another example, the two threads both show the same colour switch, but are opposed. In other words, at a first viewing angle one is green and the second is blue and at a second viewing angle the colours swap round so the first is blue and the second is green.

All of the above examples refer to the embedding of only two threads in close proximity. It is, however, within the scope of the present invention to embed more than two threads.

In the aforementioned examples, a relatively simple arrangement has been used for the process of embedding the two threads. It should, however, be appreciated that a variety of other approaches can be used to create a variety of novel effects, as described. below in further detail.

The various embodiments possible have been subdivided into four headings, windows and bridges, registration, combination and interplay effects, and process.

Windows and Bridges

A variety of techniques and processes can be used to embed or partially embed the threads into paper or other fibrous substrates during the manufacturing process.

Windowed Threads

The use of windowed threads in security documents is well known and a number of techniques have been described within the prior art for the production of windowed threads. The most commonly utilised approach is that described within EP-A-059056. In the example above we describe a method by which a single embossed window track on the mould cover is used for two threads, though it should be appreciated more than two threads can be embedded. Though it is preferable that a single window thread track is used for both threads it is possible that two or more different embossed window tracks can be used.

Indeed if more that one track is used, it is possible to provide the exposed windows of the threads in an alternating pattern or indeed a variety of patterns. It is also possible to vary the number and size of windows on each thread so for example your first thread may be exposed four times over the width of the document whereas the second thread may be exposed six times over the width of the document. The ability to alter the size and frequency of the windows independently for each thread can have additional benefits beyond the aesthetic value and these will be discussed later.

Thus far we have only referred to the threads being exposed on the one side of the document. It should be appreciated that the threads can be exposed on both sides of the document. Techniques for achieving this can be found in patent specifications EP-A-1141480 and GB-A-0228423.0.

Shaped Bridges

On the majority of security documents it is normal to produce windows having a regular rectangular shape, as illustrated in FIG. 2. However it has previously been described in patent specification WO-A-03095188 that altering the bridge shape can have both process and security benefits. Within the above specification it is proposed that, by providing the leading edge (with reference to the machine direction on the paper machine) of the bridge at an angle which is not 90° to the machine direction, significant process benefits can be gained. Further to this the angled bridges are visually distinct from traditional window bridges and therefore has greater public impact and security. It has also been found that such bridges can be used to define characters and geometric shapes which provide further security enhancements.

The technique described within WO-A-03095188 is well suited to the current invention and it has been found that additional benefits can be gained by using the two techniques in combination. Specifically it has been found that when the windows are used as part of a character, the use of multiple threads greatly enhances the visualisation of the shapes or characters in reflected light. This is because a greater area of the shape or character is exposed. The slight separation between the two threads further aids visualisation compared to a single wide thread by increasing the area over which the device works as a whole.

Figure 3:
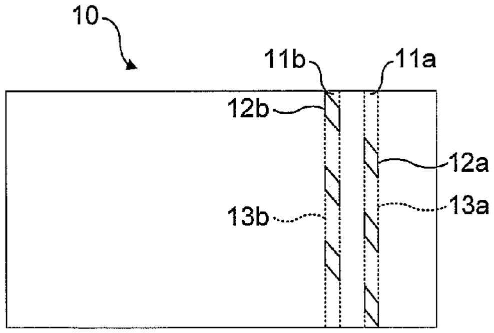
FIGS. 3 and 3*a* are alternate embodiments of a security document according to the current invention.
Figure 3A:
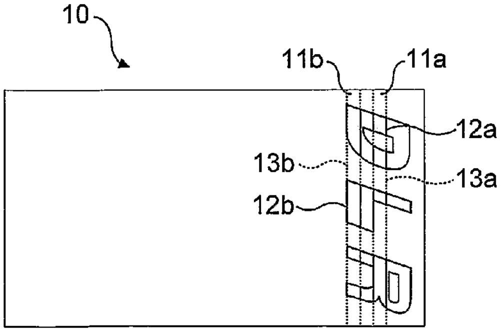

With a single angled stardust track the two threads next to each other should have windows at different heights and these two heights can be related giving the impression of a continuing line, see FIG. 3. FIG. 3*a* is a more advanced variant which is particularly beneficial in highlighting the characters DLR.

Wholly Embedded Threads

The embodiments of the invention described above have both the threads exposed at regions on the surface of the paper. It should however be appreciated that one, or even both threads, can be wholly embedded within the paper. Though not a preferred approach for producing a public security feature for viewing in reflected light, the complete embedment of threads is still viewed as highly effective public security feature when viewed in transmitted light, that is, as one would view a watermark.

Provision of Holes in Paper

As an alternative to exposing the threads in a window, one or more of the threads can be exposed in a hole or aperture formed in the paper as described in patent specification WO-A-04001130. This relates to improvements in methods of making security papers with a thread partially embedded therein and having at least one discrete aperture extending through the security paper exposing at least a part of the thread, wherein at least one edge of the thread is exposed in the aperture. This approach can be used in combination with the more traditional window or on its own. The two threads may be exposed in the same aperture or two different apertures. Alternatively only one thread may be exposed in an aperture and the other thread wholly or partially embedded as described above.

Selectively Exposed Threads

The windows described thus far have exposed the threads over their full width and selectively along the length. It is equally applicable to selectively expose the threads across their width instead of or in combination with selectively exposing them along their length. Further detail on how this might be achieved is provided below.

Denominating Windows

The ability to control the manner in which the threads are exposed across their width and along their length also introduces the possibility of introducing codes which can be read manually or by machine. Such codes could be used for identifying a particular series or denomination of document. Further detail on how this can be achieved is provided below.

Registration

Features on the threads can be registered to each other or other features in or printed onto the paper. Currently it is common to provide threads with repeating patterns or features along their length in order to avoid the need to register the threads to the paper in the machine direction during paper production. However, significant security advantages can be achieved if there is registration of the thread design or features to the paper in the machine direction. That is possible to ensure specific design elements on the thread sit in the exposed windows or under the embedded regions. For example, demetallised designs can be positioned such that they are only present in the embedded regions of the thread ensuring that in the window regions the full surface of the thread is available to be viewed.

One approach to producing paper with threads registered to the paper is described in patent specification GB-A-0228424.8. The teaching present within this particular case is equally applicable to the current invention.

Thread Design to Paper in Machine Direction

In an analogous example to that discussed above one or both threads can be inserted such that the thread design(s)/feature(s) is(are) registered with the paper in the machine direction. The thread design can be registered to the windows/bridges on the window track or alternatively to other paper features such as watermarks, or electrotypes. Though technically challenging the resultant paper is secure and extremely hard to counterfeit.

In some instances it may be preferable to only register one thread to the paper with the other thread being provided with a repeating design or features that do not require registration.

Thread Design to Print Design

As an extension to the usage of registering the thread design/feature to the paper, print applied onto the paper can also be registered to the thread design. This further enhances the security of the resultant document by providing a coherent link between the substrate, the inclusion in the substrate and the print working applied onto the substrate. As for the above example one or both threads can be provided in register.

Thread Design to Thread Design

As a further alternative it is also be possible to register the designs or features on the two or more threads to each other. In this instance neither of the threads need be registered to the paper or print, though it is preferable to do so.

The ability to register designs or features on two or more threads in close proximity is particularly beneficial when the thread contains recognisable images or diffractive devices. Providing registration between the two or more threads makes it even easier for the public to associate the two devices and thus improve the public security of the document.

Process

There are various methods by which the threads can be handled and embedded during the paper, or other substrate, making process. Further to this there is a variety of different papermaking processes that can be utilised when exploiting the current invention. The following is an overview of the processes that may be utilised for the current invention.

Cylinder Mould

It is preferable that the cylinder mould paper making process is used when manufacturing the current invention. The cylinder mould process is ideally suited to the manufacture of security papers and in particular security papers containing threads and high security watermarks. As indicated previously methods for manufacturing paper according to the invention can be found in EP-A-59056,EP-A-860298, GB-A-0228423. 0, WO-A-04001130 and EP-A-1141480. In addition to these further alternative processes utilising the cylinder mould process can be used these include the multi-layer techniques such as those described within EP-A-229645.

Fourdrinier

Although the cylinder mould paper making process is the preferred approach for the present invention, it is also possible to make use of the fourdrinier process. One example of paper containing windowed threads can be produced using a fourdrinier paper machine is described within GB-A-2260772. This process can be utilised to produce paper according to the current invention.

Split Threads on Entry

In addition to the manufacturing techniques used, it should also be noted that the manner in which the thread is supplied to the machine can vary. In its simplest embodiment, each thread is stored and unwound from separate bobbins, as is the case when embedding multiple threads across the width of a web on a paper machine, the only differences being that the threads are inserted into the papermaking machine in much closer proximity.

In a first alternative, if the two or more threads to be inserted next to each other are of the same type then a single wide thread may be stored on a single bobbin. As this single wide thread is unwound from the bobbin it is slit into two, three or more threads as required prior to entry into the paper forming VAT and contact the mould cover or paper wire. Such an approach can allow for easier control of thread-to-thread registration.

Though preferable for two or more threads of the same type, the above approach can also be used if two different threads were to be used. Here the wide thread on the bobbin is asymmetric with one half across the width defining a first thread type, e.g. a plain metallised magnetic thread and the second half across the width defines a second thread type, e.g. demetallised Cleartext™ thread.

Mark Prior to Insertion

In WO-A-03023140 a method is described by which threads are marked immediately prior to their inserting into the paper-forming vat. The threads may be marked with alphanumeric information, designs, serials numbers or the like and by controlling the marking process it is proposed that the designs can be inserted in register to the paper features. Such an approach is equally applicable to the current invention.

Combination and Interplay Effects

The presence of two or more threads present an opportunity for the threads to interact at a variety of levels and in different ways. The following are some of the methods and effects that can be achieved.

Split Features onto Multiple Threads

One of the major advantages of the current invention is it allows features to be placed onto two or more threads rather than trying to produce extremely complex threads with many features. This has two distinct benefits; firstly, the construction of the security threads can be greatly simplified with fewer process steps being required for each thread compared to producing a single thread with multiple features on it thus reducing the cost of production; secondly, threads with numerous features on can be complex and confusing to the public which reduces the security impact. Indeed certain combinations of features can in many ways conflict with each other. For example the use of demetallised threads is increasingly common and in particular Cleartext® threads. Such threads can be produced using plain metal layers or with additional optically variable diffractive or interference devices. In order to view the optically variable effect a reflection-enhancing layer is required. For security threads this reflection-enhancing layer is typically a very thin metal layer. It is increasingly desirable to have both a diffractive and a demetallised design on security threads. Unfortunately the demetallisation process that defines the demetallised feature by its very nature removes the metal layer that enables the diffractive effect to be seen. Consequently it is necessary to either limit the size of the demetallised characters or increase the width of the thread to allow the diffractive effect to be seen. The current invention overcomes this problem by allowing the diffractive effect to be on a first thread and the demetallised feature to be present on a second discrete thread thus providing a simpler, less confusing way of presenting the security features and allowing greater co-operation between the two devices.

Overt+Overt

The example above represents a combination of two overt security features and is thus referred to as overt+overt. Elaborating further on the above example it is preferable that diffractive and demetallised designs relate to each other in some way or they may even be repeated. By providing a strong visual link between the two you improve the public security as it is obvious that the two devices are related.

There are a great many variants of public security threads that can be used in combination with each other. Public security threads include those having, demetallised designs, thin film interference structures, liquid crystal layers, thermochromic layers, photochromic layers, iridescent layers, multiple different coloured metal layers, print layers. It is not uncommon for a security thread to use a combination of two or more of these public functional layers.

Overt+Covert

Rather than use two or more overt threads, an overt thread can be used in combination with a covert thread. A covert thread is one that has some machine readable property not readily apparent to the public. The covert thread may be designed such that it is hard to visualise when embedded into paper, though it is preferable that it also has some overt feature to best make use of the current invention. Examples of covert threads included those with magnetic properties (which may be coded), luminescent properties, conductivity or other machine detectable characteristics.

As indicated, it is preferable that the covert property be combined with some other overt feature on the thread. For example the detectable layer may be masked by an opaque metal layer and this opaque metal layer provides an overt feature that can be viewed by the public. As a further enhancement, rather than a plain metal layer the detectable layer can be covered by a diffractive device. Indeed many of the overt layers described above can be used in combination with a covert detectable layer.

Covert+Covert

As a further development two covert threads can be utilised. Again, one or both can be provided so they are not easily visualised, although it is preferable that they do both have an overt public function as well Tessellating Threads The threads may vary in width along their length in a regular and repeating manner. Examples of this can be found in Patent Specification EP-A-070172. In this instance the threads can be inserted into the paper such that the two threads tessellate with other.

For many years threads have been inserted into paper using a variety of techniques and as discussed previously the most commonly used technique it that described in Patent Specification EP-A-059056. Whereas this technique has proved very successful it should be recognised that the skill of counterfeiters and forgers has moved on significantly since this technique was originally developed. One approach to increase the document security is to use increasingly complex threads and expose these using larger windows, such as are proposed in Patent Specification EP-A-860298. Patent Specification WO-A-03095188 also proposes altering the shape of the windows for production reasons, but it should be noted that this also has public security benefits and increases the difficulty of producing counterfeits.

A further alternative approach proposed here is to increase the complexity of the window region. A range of techniques have been developed that allow threads to be exposed in more complex and interesting ways than previously possible. Such approaches can be used with any of the security threads currently being utilised and can also be used for both wide (greater than 2 mm) or narrow (less than 2 mm) threads.

Electrotype Bridges

Currently the majority of documents containing windowed threads are produced using a cylinder mould paper machine. The mould cover of the cylinder mould machine is embossed with a window track. This window track is a series of regular undulations forming peak and troughs. When the thread is inserted in to the paper, it is brought to lie in contact with the peaks and thus raised above the troughs. The window track is in fact a special type of watermark designed specifically for the purpose and if a document is containing a windowed thread is viewed in transmission the window track can be visualised as a watermark. Another special class of watermark is an electrotype. Here a raised impervious element is applied to the mould cover to prevent fibre deposition. Rather than resulting in a multi-tonal watermark electrotypes result in this regions of paper which when viewed in transmission give rise to single tone images. It should, however, be noted that recent developments have been moving towards multi-tonal electrotype designs, such as described in Patent Specification EP-A-1122360.

Electrotypes tend to cover small areas and can have relatively fine designs. It has been shown that rather than use a traditional embossed window track to expose the security thread, the use of electrotypes allows for a much greater range of window shapes and more complex window shapes. The use of electrotypes has allowed for the production of papers containing windowed threads where the windows themselves define information, designs or patterns.

Figure 4:
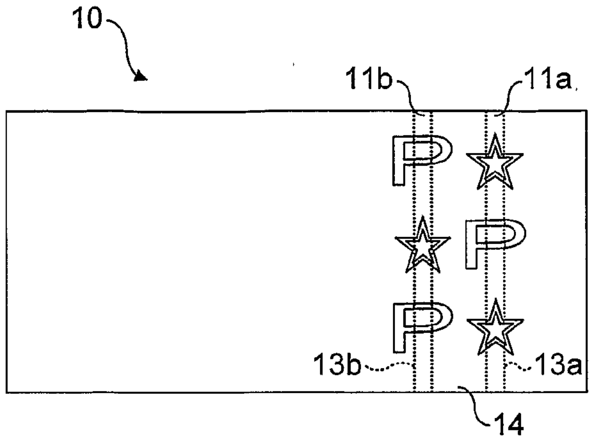
FIGS. 4 to 6 are plan views of different embodiments of documents with two threads that have been exposed selectively.

FIG. 4 shows an example of paper containing two threads 11 that have been selectively exposed using electrotypes rather than an embossed window track. In this example two different electrotypes have been used the first is a star and the second is the letter P. Both electrotypes have been used for both threads 11 in a repeating manner. It is preferable that the electrotype selected reflects some other design element present on the document within the watermark or print. This further enhances the security by providing some continuity between the various features making the document easier to comprehend and understand for the public.

The benefit is that the electrotype watermark, which is visible in both reflection and transmission viewing conditions, is perfectly in register with the thread window (s). This is difficult to counterfeit because the counterfeiter is compelled to register the counterfeit electrotype watermark as well as the counterfeit window.

Electrotype Bridges in Embossed Window Tracks

Figure 5:
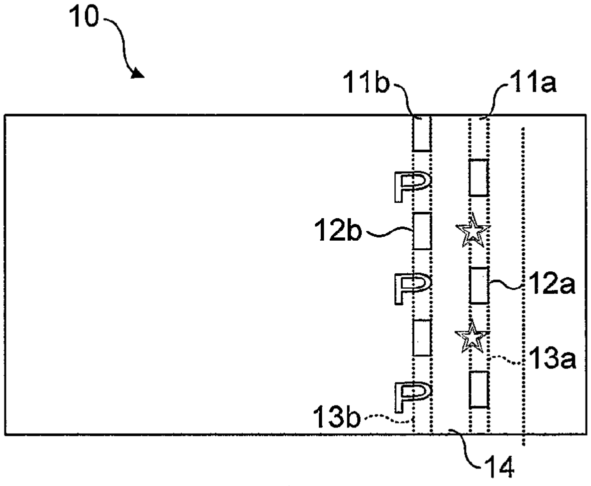

As a further enhancement of the above it has also been found that electrotypes can be used in combination with the traditional windowed thread tracks to produce striking and novel effects. FIG. 5 shows an example where a star electrotype has been used in the first embossed thread track and a P electrotype has been used in the second embossed thread track. In both case the electrotypes have been positioned so that they partially expose the thread in the bridges between the main windows formed according to EP-A-059056. That is to say, on the embossed mould cover they sit in the troughs where paper would normal deposit to form a complete bridge.

This approach allows for the benefits of a large window to expose the thread such that any features such as diffractive devices on the thread can be easily visualised. But in addition also provide the more complex and much harder to counterfeit electrotype derived complex windows.

Chequer Board Bridges

Figure 6:
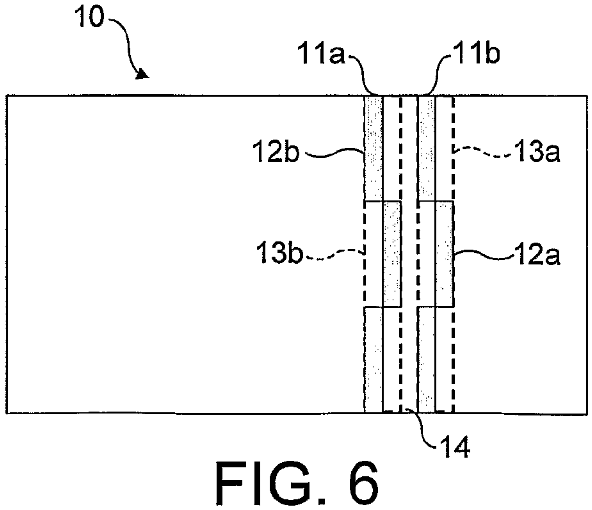

FIG. 6 shows a further variant whereby each of the threads is only partially exposed across its width to create a chequer board effect. This effect is again achieved by modifying the mould cover of the cylinder mould machine. Here use is made of an embossing, or on a smaller scale electrotype, in a chequer board pattern through which two or more stardust threads are passed. The thread is exposed on the raised (or light) portions of the emboss or the electrotype. The threads will typically wander in a 12 mm range and so will appear in different parts of the chequer board pattern. By having two threads present rather than one, the area of thread exposed is increased and hence the visualisation of the chequer board pattern is enhanced.

Bridges/Windows that Confer Information

As illustrated above, the ability to provide more complex bridges has significant benefits. One key benefit being that the novel bridge shapes can form characters, simple images, geometric shapes, patterns or other indicia. Such features can then be used to convey information to the viewer. For example the complex bridges might define denomination information, the initials of the issuing authority or replicate a demetallisation design on the thread itself. Furthermore the interplay between the threads and the watermark in the window regions markedly increases the complexity of the technical challenge facing a would be counterfeiter.

As indicated previously, the ability to provide simple repeating themes at multiple levels within the design of a security document is of major benefit when considering public security. A document and thus a document's various components needs to be instantly recognisable and any discrepancies obvious to a viewer. As the public tend to spend very little time inspecting a document and typically rely on very few of the security features present, it is essential that as strong a visual impact is made in that time as possible.

Paper with Holes and Complex Bridges

It should also be noted that the complex bridge designs need not be used in isolation or just with traditional bridges. They can be used with any of the other known paper security features but it has been found that they are particularly effective if used in combination with the hole in paper feature previously referred to and described in Patent Specification WO-A-04001130. The presence of a hole extending through the body of the paper instantly draws the public's attention to that region of the document. Then the use of complex window designs further holds the attention of the public drawing to further attention the features present both in the paper and on the thread thus enhancing security.

Two Sided

Thus far we have only referred to the thread windows being exposed on one surface of the paper. It should be recognised that the use of complex windows is equally applicable to instances where the thread windows are exposed on both sides of the paper.

Denominating Windows

In a further development it has been found that configuration of windows on a security document can be used to define a code. The size, frequency and shape of the windows can be used to define a public or machine-readable code to confer information relating to any aspect of the document. It has been found that the use of threads to provide information relating to a document or series of documents can be achieved with a single thread but with the presence of multiple threads there is an opportunity for a much greater number of coding options. For the purposes of clarity herein we shall refer to the windows providing denomination indication for a series of document but it should be recognised that the window configurations can be used to provide codes for a variety of purposes.

Number of Coding Options

The presence of multiple threads allows for an increased number of coding options and the more threads used, the more coding options are present. A variety of factors can be used to define the code, all of which may be used in isolation or in combination. These factors include window size (width and height), window shape, window frequency, window position along the length of the thread and window position with respect to a window on an adjacent thread.

Figure 7:
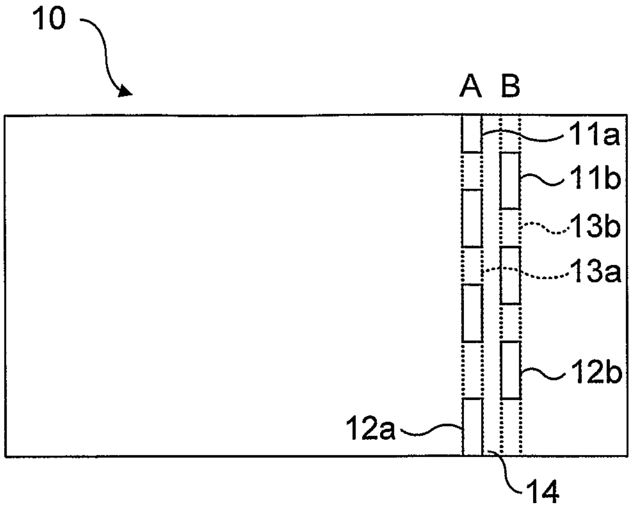
FIGS. 7 and 8 are plan views of different embodiments of documents containing two threads where the exposed windows define a first and second code respectively.
Figure 8:
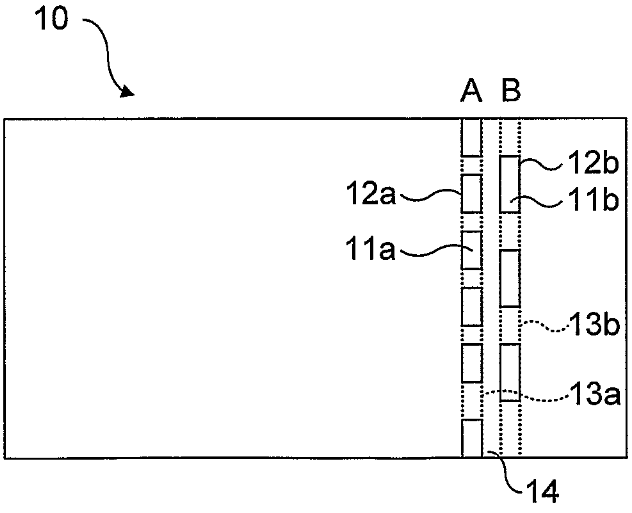

FIGS. 7 and 8 illustrate a simple example of the current concept. Here a series of documents has been produced containing two threads. The documents could be a new series of banknotes comprising five different denominations and each denomination would have its own code. Alternatively the documents could be a certificate of authenticity (COA) for software or computer products where the code would define information other-than value, for example the type of product the COA is to be applied to, the region from which the COA is issued, the replicator issuing the COA etc.

In this example each document has two threads, a first thread embedded in track A and a second thread embedded in track B. The code is defined by the size and frequency of the windows in both tracks. In this instance track B is used as a reference track. That is to say every single document in the series will always have a consistent code in track B. The presence of a reference track is advantageous for a number of reasons such as the ability to out-sort non-relevant documents, provide a reference from which to locate the code track, or provide a calibration code which could be used to help accommodate for any soiling or damage to the document.

Thus in this example the code is defined from the track A alone. For the document shown in FIG. 7 track A can be seen to comprise a thread having four windows and three bridges. For the document shown in FIG. 8 track A can be seen to comprise six windows and five bridges. Thus it can be clearly seen that the two documents can be distinguished from each other. This number of windows and bridges could then be cross-reference to a central source to determine additional information as indicated above. The central source may be a database held on a computer either locally or remote and accessed via a network or internet connection. Alternatively in the instance where the use of a computer is not possible or appropriate, a simple printed table may be provided. Alternatively rather than manually checking the code, the code could be read using suitably adapted cash handling equipment or a handheld device. Such devices would look at the reflectance of light from the document along the length of the thread.

Information Conferred by the Code

As described in the above example the code may be read and cross referenced to external source be that a computer database, look-up table or even a printed reference document. As an alternative the threads may be designed to confer information about the document directly without the need to an external source.

Referring again to FIGS. 7 and 8, the substrate is formed into two documents 10, which may be two banknotes of different denominations from a series. The frequency of the windows 12 can be used to provide the viewer with confirmation that the paper used is the correct paper for the denomination information printed on it. It is known for forgers to take a low denomination note and remove the ink. They then reprint the document as a higher denomination. This is a particular issue in countries where all notes for all denominations are of the same size.

In this example the number of windows 12 on the thread in track A would define the first numeral of the denomination and the number of windows 12 on the thread in track B would define whether the first numeral is in ones, tens hundreds etc. So in this example FIG. 7 shows a document 10 having a value of 400 and FIG. 8 shows a document 10 having a value of 600. As a further illustration a document 10 having a value of 5 would comprise a thread 11*a*, 11*b* in track A with five windows and a thread in track B with one window. Likewise a document with a value of 20 would have a thread in track A with two windows and a thread in track B with two windows.

Code Also in Machine Readable Form on Thread

Above it has already been suggested that the code defined by the windows could be read manually or by machine. As an alternative or in addition to the window code being read by machine, it is possible to provide a covert machine readable code on the thread as well. This can be done by providing the thread with a magnetic coding such as that described in EP-A-407550. This code can provide different information to that provided by the window code or the same information.

It should be appreciated that the windows on the thread(s) can be formed according to any of the techniques utilising any of the processes described already within this document. Likewise process enhancement such as paper/thread and thread/thread registration can be used to further enhance the effectiveness of the invention.

The invention claimed is:

1. A security substrate comprising:

a substrate; and at least two elongate security elements each having a width of less than or equal to 6 mm, wherein said at least two security elements are at least partially embedded within said substrate and run substantially parallel to each other with a gap therebetween of no greater than 10 mm, wherein said at least two security elements and said gap occupy a zone that has a total cross-directional width that is less than or equal to 14 mm, and wherein said at least two security elements have different security features.

2. A security substrate as claimed in claim 1, wherein said at least two security elements each have a width of less than or equal to 4 mm.

3. A security substrate as claimed in claim 2, wherein said at least two security elements each have a width of less than or equal to 2 mm.

4. A security substrate as claimed in claim 1, wherein said gap is greater than or equal to 1 mm.

5. A security substrate as claimed in claim 4, wherein said gap is greater than or equal to 2 mm.

6. A security substrate as claimed in claim 1, wherein said at least two security elements have identical security features.

7. A security substrate as claimed in claim 1, wherein said at least two security elements wander from a linear path in a cross-direction of said substrate, and wherein said cross-directional width of said zone includes an amplitude of said wander.

8. A security substrate as claimed in claim 1, wherein at least one of said at least two security elements are wholly embedded within said substrate.

9. A security substrate as claimed in claim 1, wherein at least one of said at least two security elements are exposed at windows in at least one surface of said substrate.

10. A security substrate as claimed in claim 9, wherein all of said at least two security elements are exposed via the same window.

11. A security substrate as claimed in claim 9, wherein each of said at least two security elements is exposed at separate windows to those at which the other security element is exposed.

12. A security substrate as claimed claim 11, wherein said window via which one of said at least two security elements is exposed is in register with said window via which an other of said at least two security elements is exposed.

13. A security substrate as claimed claim 11, wherein said window via which one of said at least two security elements is exposed is not in register with said window via which an other of said at least two security elements is exposed.

14. A security substrate as claimed in claim 1, wherein each of said at least two security elements is provided with at least one security feature which is registered with at least one security feature on an other of said at least two security elements.

15. A security substrate as claimed in claim 1, wherein each of said at least two security elements is provided with at least one security feature which is registered with at least one security feature on said substrate.

16. A security article comprising:

a substrate; and at least two elongate security threads each having a width of less than or equal to 6 mm, wherein said at least two security threads are at least partially embedded within said substrate and run substantially parallel to each other with a gap therebetween of no greater than 10 mm, and wherein said at least two security threads and said gap occupy a zone that has a total cross-directional width that is less than or equal to 18 mm.

17. A security substrate as claimed in claim 1, wherein said substrate is plastic.

18. A security substrate as claimed in claim 17, wherein said substrate is a filmic plastic.

19. A security substrate as claimed in claim 1, wherein said substrate is a mix of paper and plastic fibres.

20. A security substrate as claimed in claim 1, wherein said substrate is paper.

21. A security article as claimed in claim 16, wherein said security article is a banknote.

22. A security substrate as claimed in claim 1, wherein at least one of said two security elements is exposed in at least one hole or aperture through the substrate.

23. A security substrate as claimed in claim 22, wherein all of said at least two security elements are exposed at the same hole or aperture.

24. A security substrate as claimed in claim 22, wherein each of said at least two security elements is exposed in a separate hole or aperture to those at which the other security thread is exposed.

25. A security substrate as claimed in claim 24, wherein said hole or aperture via which one of said at least two security elements is exposed is in register with said hole or aperture via which another of said at least two security elements is exposed.

26. A security substrate as claimed in claim 24, wherein said hole or aperture via which one of said at least two elements is exposed is not in register with said hole or aperture at which another of said at least two security elements is exposed.

27. A security article as claimed in claim 16, wherein said security article is a passport.

28. A security article as claimed in claim 16, wherein said security article is a certificate.

29. A security article as claimed in claim 16, wherein said security article is a document of value.

30. A security substrate comprising:

a substrate having a zone with a cross-directional width of less than or equal to 18 mm;

a first elongate security thread at least partially embedded within said substrate and disposed in said zone, said first elongate security thread having a first security feature; and a second elongate security thread at least partially embedded within said substrate and disposed in said zone, said second elongate security thread having a second security feature, said first and second elongate security threads running substantially parallel to each other within said zone with a gap therebetween of no greater than 10 mm, wherein said first and second security features have a difference.

31. A security article as claimed in claim 29, wherein said difference is selected from the group consisting of opposing holographic movement effects, mutually opposed holographic image replay, different information, different viewing angles, different visual impression, different thermochromic transition temperatures, different colourshift features, and opposed colour switch features.

* * * * *